J. L. WILLIAMS.
FLUSHING VALVE.
APPLICATION FILED JUNE 3, 1912.
1,078,113.
Patented Nov. 11, 1913.
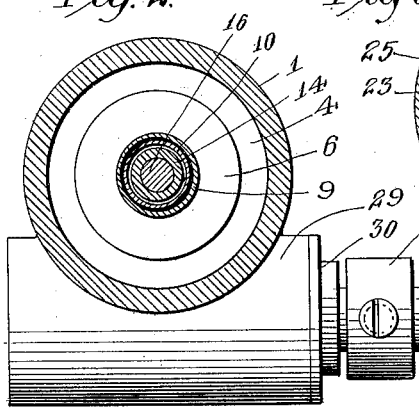
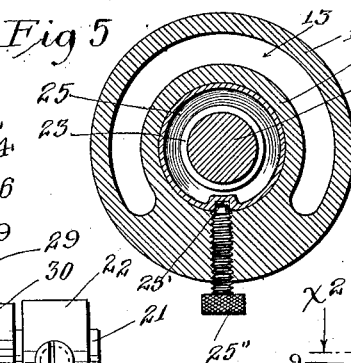
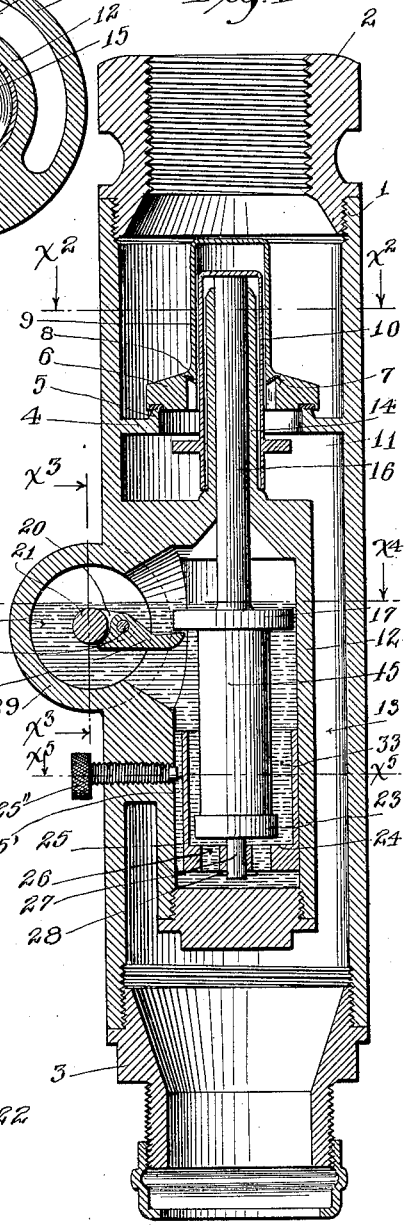
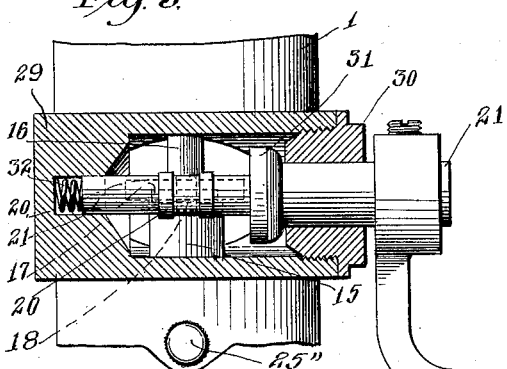
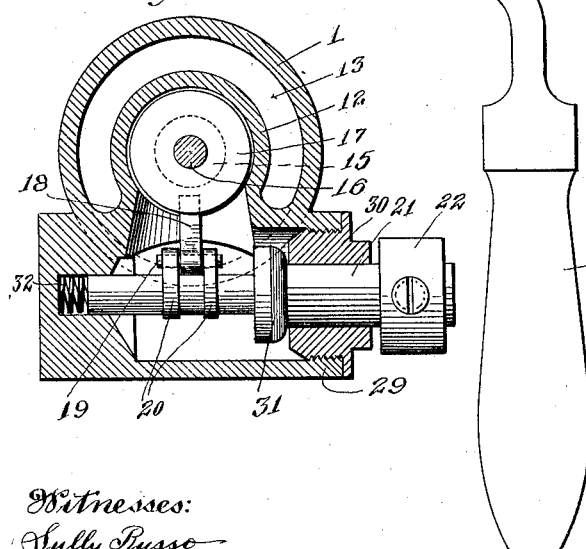
Inventor:
John L. Williams

# UNITED STATES PATENT OFFICE.

JOHN L. WILLIAMS, OF LOS ANGELES, CALIFORNIA.

FLUSHING-VALVE.

1,078,113.  Specification of Letters Patent.  Patented Nov. 11, 1913.

Application filed June 3, 1912. Serial No. 701,441.

*To all whom it may concern:*

Be it known that I, JOHN L. WILLIAMS, a citizen of the United States, residing at Los Angeles, in the county of Los Angeles and State of California, have invented a new and useful Flushing-Valve, of which the following is a specification.

This invention relates to flushing valves and particularly to that type in which after the valve is opened, the closure of the valve is automatically performed.

I have found in practice that the action of water on the parts of the valve which control the closing movement thereof is destructive and that the parts require replacement quite frequently, and the main object of the present invention is to so construct a valve of this type that oil is used in place of the water to govern the closing action of the valve. The oil is confined in a chamber in such a manner that the parts of the device which control the valve operate in this oil and thus do not deteriorate, and in addition to this the oil furnishes a perfect lubricant, insuring the smooth and perfect working of the parts. The oil being confined in a chamber is kept from any contact with the water which flows through the valve. The valve thus constructed will operate for an indefinite period without requiring attention as the controlling parts of the valve are not affected by the water. The larger parts of the valve which do come in contact with the water are of a size and construction such that the corrosive action of the water on them is of no consequence.

Referring to the drawings:—Figure 1 is a vertical section through the invention. Fig. 2 is a section on line $x^2$—$x^2$ Fig. 1. Fig. 3 is a section on line $x^3$—$x^3$ Fig. 1. Fig. 4 is a section on line $x^4$—$x^4$ Fig. 1. Fig. 5 is a cross section on line $x^5$—$x^5$, Fig. 1.

The device comprises a main barrel 1 in the upper end of which is screwed a nipple 2 adapted for connection to the water inlet pipe not shown. In the lower end of the barrel 1 is screwed a nipple 3 adapted for connection to the discharge pipe not shown. Within the barrel 1 is a flange 4 with an annular vertical valve seat 5 upon which normally rests a large valve 6. The valve 6 is an annular valve and is formed with a valve seat 7 and normally resting on the valve seat 7 is a small valve 8 having a socket 9. Extending through the center of valves 6 and 8 and fitting loosely in the socket 9 is a socket 10 with a valve lifting flange 11.

An inner barrel 12 is arranged concentrically within the barrel 1 and joined to the side wall thereof; the barrel 12 is closed from the barrel 1 and an annular water passage 13 is formed between the barrels 12 and 1. Projecting from the upper end of the inner barrel 12 is a hollow guide 14 over which the socket 10 loosely fits. Within the barrel 12 is a controlling plunger 15 with a stem 16 which slides in the guide 14. The plunger 15 has a flange 17 which is adapted to be engaged by a lifting finger 18 which is pivoted at 19 to an arm 20 on a shaft 21 which is operated by a handle 22 whereby as the handle 22 is pushed down the lifting finger 18 acts against flange 17 and lifts plunger 15 until the end of the lifting finger 18 passes off from the edge of the flange 17 when the plunger 15 can drop by gravity, and if the handle 22 is not restored manually it will by gravity swing back to its original position, which action will take place quicker than the downward movement of the plunger 15 and the lifting finger 18 will then be idly restricted as it sweeps back across the flange 17 until it lies below the flange 17. This construction insures the release of the plunger 15 automatically whether the handle 22 is released or not.

On the lower end of the plunger 15 is a valve 23 which rests against a valve seat 24 formed on a piston 25 which is slidable vertically in the inner barrel 12. In the lower wall of the piston 25 are oil passages 26. The piston 25 has a channel 25' formed in its side wall and a thumb-screw 25" projects through the main body wall 1 and its end extends into the channel 25'. By adjusting the screw 25" in either direction, its end may be caused to protrude a greater or less degree into the channel and to thereby regulate the cross sectional area of the channel at this point. This affords a means for regulating the flow of oil therethrough, as will be described. The plunger 15 has a short stem 27 which extends loosely through the bottom of the piston 25 and a pin 28 extends through the stem 27 at a point slightly below the bottom of the piston 25 when the valve 23 is seated, as indicated in Fig. 1, which permits a slight amount of upward movement of plunger 15 before the pin 28 strikes the piston 25.

The shaft 21, arm 20 and lifting finger 18 lie within an offset chamber 29 which communicates with the interior of the barrel 1 and the shaft 21 has a close fitting joint in a cap 30 which is screwed in the end of the chamber 29. A flange 31 is formed on the shaft 21 and a spring 32 presses against the end of the shaft 21 and holds the flange 31 against the plug 30, preventing end motion of shaft 21. Oil 33 is placed within the inner barrel 12 and this oil has access to the chamber 29 so that all parts within the barrel 12 and chamber 29 are perfectly lubricated.

In operation the parts normally stand as shown in Fig. 1. The water is prevented from passing down through the outer barrel 1 by the closed valves 8 and 6. Upon pulling the handle 22 the plunger 15 is lifted and its stem 16 immediately and simultaneously lifts socket 10 and as soon as the upper end of socket 10 strikes the upper end of socket 9 the latter socket is also lifted and opens the small valve 8, thereby allowing a quantity of water to commence to flow past the valve 8. At this time the flange 11 is slightly below the valve 6, not yet having come in contact therewith, and continued further upward movement of plunger 15 and parts carried thereby brings flange 11 against the large valve 6 and then lifts the latter, thereby producing a large opening through which a large volume of water rushes down through the annular space 13. The object of first opening the smaller valve is to make the operation of the device easy. If the full valve area were opened at once the pressure would be so great that a considerable muscular effort would be required. As the plunger 15 was moved upward the piston 25 was raised therewith by the pin 28 and the oil circulated through the holes 26 sufficiently freely to not impede the comparatively quick upward movement of the parts when the handle 22 was operated. As soon as the plunger 15 commences its downward movement its valve 23 closes against the valve seat 24 of the piston and the oil in the barrel 12 below the piston retards the downward movement of the piston, plunger 15 and valves carried thereby to a speed proportionate to the rate the oil can be displaced and flow up through the channel 25' of the piston into the space in the chamber 12 above the piston. The regulation of this flow of oil and consequent retardation of closing movement of valves 6 and 8 is accomplished by adjusting the thumb-screw 25" to cause the screw to project a greater or less distance into the channel 25' and thereby correspondingly restrict the flow of oil through that channel. This retardation of the closing movement insures that the valves 6 and 8 are held open sufficiently long to permit the necessary water to flow through the device. After these valves have closed the piston settles still lower than the plunger 15 until it is stopped by the pin 28 and then lies in normal position as shown in Fig. 1. This gives a clearance space between the valve 23 and piston 25 to permit of the free oil circulation which is necessary to allow the relatively quick upward opening movement of the parts.

The water in passing down through the barrel 1 is kept from entering the inner barrel 12 by the stem 16 which closely fits in the guide 14 and by reason of the fact that the stem and guide project a considerable distance above the valves 8 and 6, and the sockets 9 and 14 are of such a length that the water in its downward passage past the valve 8 or valve 6 cannot work up high enough inside either of the sockets 9 or 10 to reach the upper end of the guide 14, thus no water enters the barrel 12 which contains the controlling parts of the device and the oil therein keeps these parts perfectly lubricated and exerts no deleterious effect on them.

During the closing action, the large valve 6 closes first and the small valve 8 closes next. Thus by shutting off the flow of water by the successive closing of a plurality of valves rather than by shutting off the flow of water by closing a single valve, I greatly lessen the shock due to the valve closing operation. The closing of the first valve checks a part of the flow of water, obviously only imparting a slight shock, while the closing of the second valve stops the flow of the remaining water and obviously gives but a slight shock.

What I claim is:—

1. In a flushing valve, a vertical outer barrel having a water inlet at its upper end and a water outlet at its lower end, an inner barrel within the outer barrel and having no communication therewith, a valve in the outer barrel for controlling the passage of water therethrough, mechanism within the inner barrel having an operative connection with said valve for controlling the movement of the valve, said connection extending through the upper end of the inner barrel, oil within said inner barrel for coöperating with the mechanism therein and for lubricating the same, and means between said upper water inlet and said connection for preventing water which enters the inlet from flowing down along the connection and entering the inner barrel.

2. A flushing valve comprising a vertical outer barrel having a water inlet at its upper end and a water outlet at its lower end, an inner barrel, a valve in the outer barrel for controlling the passage of water therethrough, a socket on said valve projecting a substantial distance upwardly therefrom, mechanism within the inner barrel having an extension through the upper end of the inner barrel projecting into said socket for raising the same and controlling the lowering movement of the same, and oil within the inner barrel coöperating with said mechanism.

3. A flushing valve comprising an outer barrel having water inlet and outlet, an inner barrel within the outer barrel, a valve in the outer barrel for controlling the passage of water therethrough, a plunger in the inner barrel, a guide on said inner barrel projecting a substantial distance above the same, a stem on said plunger extending through said guide, a socket inclosing said guide and stem and having an operative engagement therewith, a valve carried by the lower end of the socket, a piston within the inner barrel provided with valve means regulating the upward and downward movements of the plunger, and oil in the inner barrel for coöperating with the mechanism therein.

4. An outer barrel provided with a water inlet and outlet, an inner barrel within the outer barrel, a large valve in the outer barrel for controlling the passage of water therethrough, a small valve for controlling the passage of water through the large valve, a socket extending above the small valve, a guide on the inner barrel extending above the same, a plunger within the inner barrel, a stem on the plunger projecting through the guide, a socket over the guide and operated by the stem, and sliding within the first socket, a flange on the second socket for lifting the large valve, a piston within the inner barrel with valve means for regulating the movement of the plunger, and oil in the inner barrel for coöperating with the parts therein.

5. An outer barrel provided with a water inlet and outlet, an inner barrel within the outer barrel, a large valve in the outer barrel for controlling the passage of water therethrough, a small valve for controlling the passage of water through the large valve, a socket extending above the small valve, a guide on the inner barrel extending above the same, a plunger within the inner barrel, a stem on the plunger projecting through the guide, a socket over the guide and operated by the stem, and sliding within the first socket, a flange on the second socket for lifting the large valve, a valve on the lower end of the plunger, a piston within the inner barrel having ports adapted to be closed by said latter valve, a short stem on the plunger projecting through the floating piston, means on the short stem limiting the movement of the piston thereon, and oil in the inner barrel coöperating with the parts therein.

6. An outer barrel provided with a water inlet and outlet, an inner barrel within the outer barrel, a large valve in the outer barrel for controlling the passage of water therethrough, a small valve for controlling the passage of water through the large valve, a socket extending above the small valve, a guide on the inner barrel extending above the same, a plunger within the inner barrel, a stem on the plunger projecting through the guide, a socket over the guide and operated by the stem, and sliding within the first socket, a flange on the second socket for lifting the large valve, a piston within the inner barrel with valve means for regulating the movement of the plunger, oil in the inner barrel for coöperating with the parts therein, a flange on the upper end of the plunger, a chamber formed on the side of the outer barrel and communicating with the inner barrel, an operating shaft projecting into said chamber, an arm on the operating shaft, and a lifting finger pivoted to the arm and engaging the flange on the plunger.

7. A flushing valve comprising an outer barrel having water inlet and outlet, an inner barrel within the outer barrel, a valve in the outer barrel for controlling the passage of water therethrough, a plunger in the inner barrel, a guide on said inner barrel projecting a substantial distance above the same, a stem on said plunger extending through said guide, a socket inclosing said guide and stem and having an operative engagement therewith, a valve carried by the lower end of the socket, a piston within the inner barrel provided with valve means regulating the upward and downward movements of the plunger, oil in the inner barrel for coöperating with the mechanism therein, said piston having a longitudinal channel in its side wall and a screw projecting through the outer barrel and having its end extending into said channel and regulating the flow of oil through said channel.

In testimony whereof I have hereunto set my hand at Los Angeles, California, this 29th day of May, 1912.

JOHN L. WILLIAMS.

In presence of—
  G. T. Hackley,
  M. E. Blasdel.

---

Copies of this patent may be obtained for five cents each, by addressing the "Commissioner of Patents, Washington, D. C."